United States Patent
Qi et al.

(10) Patent No.: US 11,876,884 B2
(45) Date of Patent: Jan. 16, 2024

(54) COMMUNICATION METHOD AND OPTICAL MODULE

(71) Applicant: HUAWEI TECHNOLOGIES CO., LTD., Guangdong (CN)

(72) Inventors: Yunlei Qi, Dongguan (CN); Chunrong Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/368,986

(22) Filed: Jul. 7, 2021

(65) Prior Publication Data

US 2021/0336762 A1 Oct. 28, 2021

Related U.S. Application Data

(63) Continuation of application No. PCT/CN2019/129697, filed on Dec. 30, 2019.

(30) Foreign Application Priority Data

Jan. 22, 2019 (CN) .......................... 201910059723.1

(51) Int. Cl.
*H04B 10/50* (2013.01)
*H04B 10/66* (2013.01)
(Continued)

(52) U.S. Cl.
CPC ........... *H04L 7/0075* (2013.01); *H04B 10/40* (2013.01); *H04B 10/50* (2013.01); *H04B 10/66* (2013.01);
(Continued)

(58) Field of Classification Search
USPC ........................................... 398/25, 154, 155
See application file for complete search history.

(56) References Cited

U.S. PATENT DOCUMENTS 5,349,653 A * 9/1994 Kurokawa .............. H03M 9/00
341/101
9,608,755 B2 3/2017 Moynihan
(Continued)

FOREIGN PATENT DOCUMENTS

CN 101827098 A 9/2010
CN 102244572 A 11/2011
(Continued)

OTHER PUBLICATIONS

Chaloupka Zdenek et al: "Transparent clock characterization using IEEE 1588 PTP timestamping probe",2015, 6 pages.
(Continued)

*Primary Examiner* — Li Liu
(74) *Attorney, Agent, or Firm* — HUAWEI TECHNOLOGIES CO., LTD.

(57) ABSTRACT

This application provides a communication method and an optical module. The method includes: A first optical module determines a first delay. The first optical module sends the first delay to an interface chip. According to the communication method and the optical module that are provided in this application, a delay in the optical module can be reported to the interface chip, so as to improve precision of time synchronization between a master clock and a slave clock, thereby further improving clock precision of a network device.

20 Claims, 10 Drawing Sheets

(51) Int. Cl.
  H04L 7/00 (2006.01)
  H04B 10/40 (2013.01)
  H04Q 11/00 (2006.01)

(52) U.S. Cl.
  CPC ............ *H04Q 2011/0045* (2013.01); *H04Q 2213/1336* (2013.01); *H04Q 2213/36* (2013.01)

(56) References Cited

U.S. PATENT DOCUMENTS

| | | | | |
|---|---|---|---|---|
| 2012/0213508 | A1* | 8/2012 | Moynihan | H04J 3/0682 398/154 |
| 2012/0263195 | A1* | 10/2012 | Li | G04G 7/02 370/510 |
| 2013/0195443 | A1* | 8/2013 | Yin | H04J 3/0638 398/25 |
| 2014/0344490 | A1* | 11/2014 | Tsfaty | G06F 13/4286 710/106 |
| 2015/0244455 | A1* | 8/2015 | Liang | H04J 3/0667 398/16 |
| 2016/0043823 | A1* | 2/2016 | Zhao | H04J 3/0697 370/350 |
| 2018/0076949 | A1* | 3/2018 | Mayer | H04B 10/40 |
| 2018/0212696 | A1* | 7/2018 | Su | H04J 3/1652 |
| 2020/0195363 | A1* | 6/2020 | Wang | H04J 3/0667 |
| 2020/0221195 | A1* | 7/2020 | Bleck | H04Q 11/0067 |

FOREIGN PATENT DOCUMENTS

| | | | |
|---|---|---|---|
| CN | 105743570 A | 7/2016 | |
| CN | 108650051 A | 10/2018 | |
| CN | 109699199 A | 4/2019 | |
| EP | 3664375 A1 | 6/2020 | |
| JP | 2009239527 | * 10/2009 | H04B 10/02 |
| JP | 2009239527 A | 10/2009 | |
| WO | 2011120262 A1 | 10/2011 | |
| WO | 2012105354 A1 | 8/2012 | |
| WO | WO-2017049546 A1 | * 3/2017 | H04J 3/0658 |

OTHER PUBLICATIONS

IEEE Standard for Ethernet, IEEE Computer Society, IEEE 802.3-2018, Sponsored by the LAN/MAN Standards Committee, 5600 pages.

* cited by examiner

COMMUNICATION METHOD AND OPTICAL MODULE

CROSS-REFERENCE TO RELATED APPLICATIONS

This application is a continuation of International Application No. PCT/CN2019/129697, filed on Dec. 30, 2019, which claims priority to Chinese Patent Application No. 201910059723.1, filed on Jan. 22, 2019. The disclosures of the aforementioned applications are hereby incorporated by reference in their entireties.

TECHNICAL FIELD

Embodiments of this application relate to the field of communications technologies, and in particular, to a communication method and an optical module.

BACKGROUND

In a mobile communications network, a base station based on a time division duplex (TDD) standard needs to meet a strict time synchronization requirement. Otherwise, a radio signal sent by the base station causes interference to another base station, and consequently a base station in an adjacent area cannot work normally.

Currently, time synchronization between different base stations may be implemented by using a clock protocol, for example, an Institute of Electrical and Electronics Engineers (IEEE) 1588 V2 protocol. The 1588 V2 protocol is a precision clock synchronization protocol standard for network measurement and system control. The 1588 V2 protocol is also referred to as a precision time protocol (PTP), and can implement time synchronization between a plurality of network devices at a microsecond level. Currently, in the 1588 V2 protocol, time synchronization between network devices is implemented in a master-slave clock manner. Time information is encoded, so that master-slave time synchronization is implemented by using a network symmetry and delay measurement technology through bidirectional packet message interaction. Specifically, when sending a packet and receiving a packet, a master clock and a slave clock perform timestamping on the packet, so as to calculate a time difference between the master clock and the slave clock. The slave clock calibrates the local time based on the calculated time difference.

Currently, how to further improve precision of time synchronization between a master clock and a slave clock to further improve clock precision of a network device is a technical problem that urgently needs to be resolved currently.

SUMMARY

Embodiments of this application provide a communication method and an optical module, to report a delay in the optical module to an interface chip, so as to improve precision of time synchronization between a master clock and a slave clock, thereby further improving clock precision of a network device.

A first aspect of this application provides a communication method, including:

A first optical module determines a first delay.

The first optical module sends the first delay to an interface chip.

In this solution, because a delay reporting register access interface is defined in the first optical module, the first optical module may report the first delay to the interface chip through the delay reporting register access interface, therefore, the first delay may be compensated to a timestamp of a packet that is recorded by the interface chip, so as to improve precision of time synchronization between a master clock and a slave clock, thereby further improving clock precision of a network device.

In a possible implementation, the first optical module is a gray optical module. The first optical module includes an optical transmitter. The optical transmitter includes an inbound interface and an outbound interface. That a first optical module determines a first delay includes:

The first optical module receives a first data flow through the inbound interface.

The first optical module sends the first data flow to a second network device through the outbound interface.

The first optical module determines that a delay generated when the first data flow is transmitted in the optical transmitter is the first delay.

In this solution, the first delay may be the delay generated when the first data flow is transmitted in the optical transmitter in the first optical module. In addition, because the optical transmitter includes different processing circuits, the first delay may alternatively be a delay caused when each of the different processing circuits in the optical transmitter processes the first data flow.

Specifically, the first delay may be a delay generated when the first data flow is transmitted from the inbound interface in the optical transmitter to the outbound interface in the optical transmitter, or may be a delay caused when at least one processing circuit included in the optical transmitter processes the first data flow, or certainly may be a sum of a delay caused when at least one processing circuit included in the optical transmitter processes the first data flow and a default value or a design value.

In a possible implementation, the first optical module is a colored optical module. The first optical module includes an optical transmitter and a first optical receiver.

Before the first optical module determines the first delay, the method further includes:

The first optical module receives a first data flow by using the optical transmitter, where a delay generated when the first data flow is transmitted in the optical transmitter includes a second delay.

The first optical module sends the first data flow to a second optical receiver in a second optical module in a second network device by using the optical transmitter, where a delay generated when the first data flow is transmitted in the second optical receiver includes a third delay.

A sum of the second delay and the third delay is the first delay.

The first optical module receives, by using the first optical receiver, a second data flow sent by the second network device, where the second data flow carries indication information.

That a first optical module determines a first delay includes:

The first optical module determines the first delay based on the indication information.

In this solution, the first optical module is the colored optical module in the first network device, and the second optical module is a colored optical module in the second network device. The first optical module includes the optical transmitter and the first optical receiver. After receiving the first data flow by using the optical transmitter, the first optical module sends the first data flow to the second optical receiver in the second optical module in the second network device by using the optical transmitter. Therefore, the second delay generated when the first data flow is transmitted in the first optical module and the third delay generated when the first data flow is transmitted in the second optical module may be measured based on the first data flow.

Further, after determining the second delay generated when the first data flow is transmitted in the first optical module, the first optical module sends the first data flow including the second delay to the second optical module. After determining the third delay generated when the first data flow is transmitted in the second optical module, the second optical module determines the sum of the obtained second delay and the obtained third delay as the first delay. After determining the first delay, the second optical module sends the second data flow to the first optical module. The second data flow carries the indication information. Therefore, the first optical module may determine the first delay based on the indication information.

In a possible implementation, the indication information includes the first delay.

In a possible implementation, when the first optical module does not support delay measurement, the first delay is a design value.

In this solution, if the first optical module does not have a delay measurement function, the first delay may be a preset design value, or may be a simulation value obtained through simulation, or certainly may be a default value.

In a possible implementation, the method further includes:

When the first data flow is transmitted to a first circuit, the first optical module extracts a first indication signal carried in the first data flow.

When the first data flow is transmitted to a second circuit, the first optical module extracts a second indication signal carried in the first data flow.

The first optical module determines the first delay based on the first indication signal and the second indication signal.

In a possible implementation, that the first optical module determines the first delay based on the first indication signal and the second indication signal includes:

The first optical module measures a phase difference between the first indication signal and the second indication signal.

The first optical module determines the first delay based on the phase difference.

Both the first indication signal and the second indication signal may be alignment marker AM indication signals, or the first indication signal may be an AM indication signal and the second indication signal may be a digital signal processing DSP frame header signal.

In the foregoing solution, when the first data flow is transmitted to the first circuit, the first optical module extracts the first indication signal carried in the first data flow. When the first data flow is transmitted to the second circuit, the first optical module extracts the second indication signal carried in the first data flow. Then, the first optical module may determine the first delay by measuring the phase difference between the first indication signal and the second indication signal by using a high-precision phase discrimination algorithm. Therefore, precision of the determined delay can be improved.

The first circuit and the second circuit may be any two different circuits in the first optical module.

Further, both the first indication signal and the second indication signal may be AM indication signals, or the first indication signal may be an AM indication signal and the second indication signal may be a digital signal processing DSP frame header signal. In addition, the first indication signal and the second indication signal may alternatively be other easily identified signals, for example, identifiers inserted into the first data flow.

In a possible implementation, the interface chip includes at least one of a physical layer PHY chip and a media access control layer MAC chip.

A second aspect of this application provides an optical module, used as a first optical module and including:

a processor, configured to determine a first delay.

The processor is further configured to send the first delay to an interface chip.

In a possible implementation, the first optical module is a gray optical module. The first optical module includes an optical transmitter. The optical transmitter includes the processor, an inbound interface, and an outbound interface.

The optical transmitter is configured to receive a first data flow through the inbound interface.

The optical transmitter is further configured to send the first data flow to a second network device through the outbound interface.

The processor is further configured to determine that a delay generated when the first data flow is transmitted in the optical transmitter is the first delay.

In a possible implementation, the first optical module is a colored optical module in a first network device. The first optical module includes an optical transmitter and a first optical receiver. The first optical receiver includes the processor.

The optical transmitter is configured to receive a first data flow, where a delay generated when the first data flow is transmitted in the optical transmitter is a second delay.

The optical transmitter is further configured to send the first data flow to the second optical receiver in a second optical module in a second network device, where a delay generated when the first data flow is transmitted in the second optical receiver is a third delay.

A sum of the second delay and the third delay is the first delay.

The first optical receiver is configured to receive a second data flow sent by the second network device, where the second data flow carries indication information.

The processor is specifically configured to determine the first delay based on the indication information.

In a possible implementation, the indication information includes the first delay.

In a possible implementation, when the first optical module does not support delay measurement, the first delay is a design value.

In a possible implementation, the optical transmitter includes a first circuit and a second circuit. The processor is further configured to:

when the first data flow is transmitted to the first circuit, extract a first indication signal carried in the first data flow;

when the first data flow is transmitted to the second circuit, extract a second indication signal carried in the first data flow; and determine the first delay based on the first indication signal and the second indication signal.

In a possible implementation, the processor is further configured to:
measure a phase difference between the first indication signal and the second indication signal; and
determine the first delay based on the phase difference.

Both the first indication signal and the second indication signal are alignment marker AM indication signals, or the first indication signal is an AM indication signal and the second indication signal is a digital signal processing DSP frame header signal.

In a possible implementation, the interface chip includes at least one of a physical layer PHY chip and a media access control layer MAC chip.

According to the communication method and the optical module that are provided in this application, after determining the first delay, the first optical module sends the determined first delay to the interface chip. Because the delay reporting register access interface is defined in the first optical module, the first optical module may report the first delay to the interface chip through the delay reporting register access interface, to add the first delay to the timestamp of the packet that is recorded by the MAC layer or the PHY layer, so as to improve precision of time synchronization between the master clock and the lave clock, thereby further improving clock precision of the network device.

DESCRIPTION OF EMBODIMENTS

Figure 1:
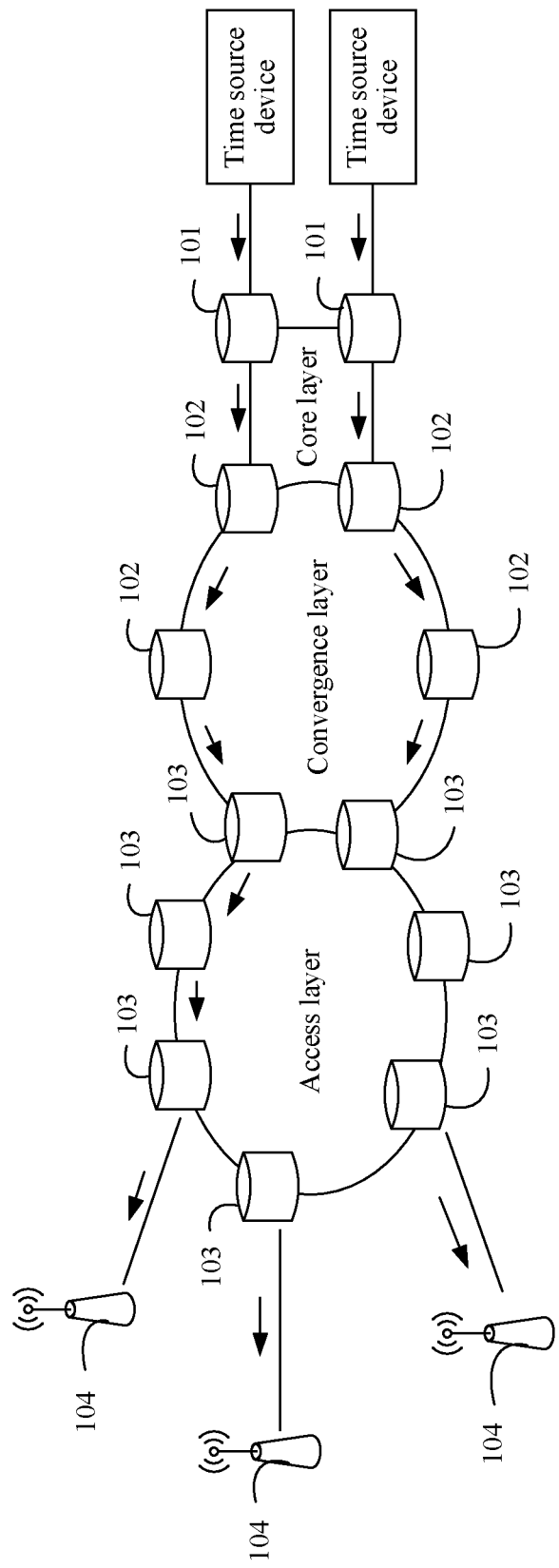
FIG. 1 is a schematic diagram of an application scenario according to an embodiment of this application.

The following describes some terms in this application, to facilitate understanding of a person skilled in the art.

(1) An optical module mainly includes an optical-to-electrical converter and an electrical signal processor. The optical module includes two parts: an optical transmitter and an optical receiver. The electrical signal processor includes a clock and data recovery (CDR) chip or an optical digital signal processing (oDSP) chip. The optical module usually performs optical-to-electrical conversion and/or electrical-to-optical conversion. For example, an optical module at a transmit end converts an electrical signal into an optical signal, and transmits the optical signal obtained through conversion to an optical module at a receive end through an optical fiber. Then, the optical module at the receive end converts the optical signal into an electrical signal, to process the electrical signal obtained through conversion.

(2) A network device may be a device configured to communicate with a mobile device. The network device may be a router, a switch, a packet transport network (PTN) device, an optical transport network (OTN) device, a passive optical network PON) device, a synchronous digital hierarchy (SDH) device, or the like. Alternatively, the network device may be an access point (AP) in a WLAN, a base transceiver station (BTS) in a GSM or CDMA, a NodeB (NB) in WCDMA, an evolved NodeB (eNB or eNodeB) in LTE, a network relay station or a network access point, a vehicle-mounted device, a wearable device, a network device in a future 5G network, a network device in a future evolved PLMN network, a new-generation NodeB (gNodeB) in an NR system, or the like.

(3) A delay reporting register access interface may also be referred to as a register access interface or a delay reporting interface, and is configured to report, to an interface chip, a delay generated when a packet is transmitted in an optical transmitter or an optical receiver in a first optical module, or is configured to report, to an interface chip, a delay generated when a packet is transmitted in an optical transmitter in a first optical module and a delay generated when a packet is transmitted in an optical receiver in a second optical module.

(4) In this application, "at least one" may mean one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one (piece) of the following" or a similar expression thereof means any combination of these items, including any combination of singular items (pieces) or plural of items (pieces). For example, at least one (piece) of a, b, or c may represent: a, b, c, a and b, a and c, b and c, or a, b, and c, where a, b, and c may be singular or plural. A range described in "above", "below", or the like includes boundary points.

(5) A unit in this application is a function unit or a logical unit, and may be in a form of software. A function of the unit is implemented by executing program code by a processor. The unit may alternatively be in a form of hardware.

A person skilled in the art may understand that a communication method provided in the embodiments of this application may be applied to an application scenario in which an optical module reports a delay to an interface chip. The interface chip includes at least one of a physical layer (PHY) chip and a media access control layer (MAC) chip. The interface chip can implement a function of the PHY layer. In a mobile communications network, a base station based on a time division duplex (TDD) standard needs to meet a strict time synchronization requirement. Otherwise, a radio signal sent by the base station causes interference to another base station, and consequently a base station in an adjacent area cannot work normally. To implement time synchronization between base stations, a network protocol usually needs to be enabled to transmit time information. In the embodiments of this application, an example in which a 1588V2 protocol is enabled to transmit the time information is used for description. Certainly, the time information may alternatively be transmitted by using another protocol. For example, clock class information may be represented by using synchronization status message (SSM) in an SDH protocol.

FIG. 1 is a schematic diagram of an application scenario according to an embodiment of this application. As shown in FIG. 1, a time source device is usually deployed on a core layer of a wireless network, and a global positioning system (GPS) or BeiDou satellite time is used as a reference source. Then, time information is transmitted to a transmission device 101 through an external time assistant interface such as 1 pulse per second and time of day (1 Pulse per Second and Time of Day, 1PPS+TOD) or a PTP interface (an Ethernet interface enabling a 1588V2 protocol). The transmission device 101 transmits the time information to a convergence layer device 102 downward hop by hop from the core layer through the PTP interface. Then, the convergence layer device 102 transmits the time information to an access layer device 103 downward hop by hop. The access layer device 103 transmits the time information to a connected base station 104 through the external time assistant interface such as the 1PPS+TOD or the PTP interface. Therefore, time synchronization between network-wide base stations is implemented.

The transmission device 101, the convergence layer device 102, and the access layer device 103 each may be a network device such as a router, a switch, a PTN device, an OTN device, or a PON device.

It should be noted that time synchronization between the transmission device 101, the convergence layer device 102, and the access layer device 103 may also be performed by using the solution described in this embodiment of this application.

Figure 2:
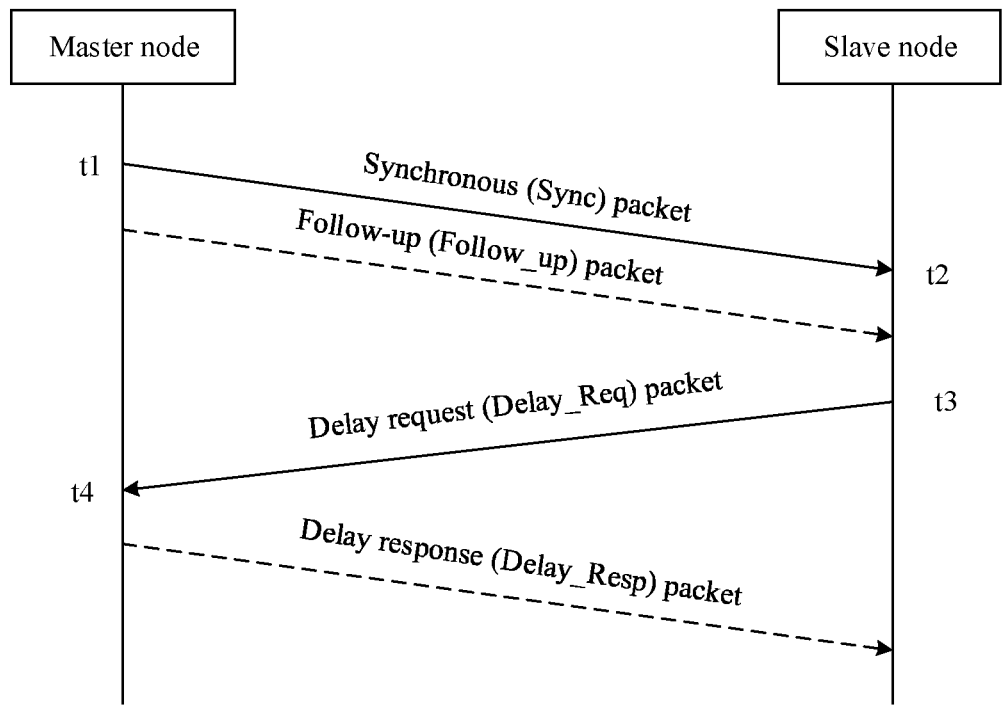
FIG. 2 is a schematic diagram of calculating a time difference between a master clock and a slave clock.

The following specifically describes how to implement time synchronization between base stations by using a 1588V2 protocol as an example. The 1588V2 protocol is also referred to as a PTP for short, and is a precision time synchronization protocol that can implement time synchronization between a plurality of network devices. A core idea of the 1588V2 protocol is as follows: Time information is encoded in a master-slave clock manner, so that master-slave time synchronization is implemented by using a network symmetry and delay measurement technology through bidirectional packet message interaction. Specifically, when sending a packet and receiving a packet, a master clock and a slave clock perform timestamping on the packet, so as to calculate a time difference between the master clock and the slave clock. The slave clock calibrates the local time based on the calculated time difference. FIG. 2 is a schematic diagram of calculating a time difference between a master clock and a slave clock. As shown in FIG. 2, a master node sends a synchronous (Sync) packet to a slave node, and records a sending timestamp t1 into a register. After receiving the synchronous packet, the slave node records a receiving timestamp t2. In addition, the master node sends a follow-up packet to the slave node, and sends the follow-up packet including the timestamp t1 to the slave (Slave) node. The slave node sends a delay request (Delay_Req) packet to the master (Master) node. The delay request packet carries a timestamp t3. After receiving the delay request packet, the master node records a receiving timestamp t4. The master node sends a delay response (Delay_Resp) packet including t4 to the slave node. A clock in the master node is a master clock, and a clock in the slave node is a slave clock.

Based on the foregoing timestamps t1, t2, t3, and t4, the slave clock may calculate a delay (Delay) and a time difference (Offset) between the slave clock and the master clock according to the following formula (1) and formula (2). The slave clock may calibrate a local timestamp based on the delay (Delay) and the time difference (Offset), to implement time synchronization between the master clock and the slave clock.

$$\text{Delay}=(t2-t1+t4-t3)/2 \quad (1)$$

$$\text{Offset}=(t2-t1-t4+t3)/2 \quad (2)$$

According to a principle of the 1588V2 protocol, timestamping reference planes of the master clock and the slave clocks are at a physical medium dependent interface (MDI) layer of a PTP port. However, because a timestamping event is triggered by a PTP packet header, and the MDI layer cannot identify the PTP packet header, timestamping cannot be completed. Therefore, during specific implementation, timestamping is usually performed at a media access control (MAC) layer or a physical (PHY) layer, to record a timestamp of a packet, and a delay between a timestamping point on the 1588 packet at the MAC layer or PHY layer and an MDI layer of an optical module is measured and added to the timestamp recorded by the MAC layer or the PHY layer. Therefore, a timestamping function at the MDI layer is implemented. The MDI layer of the optical module is a port of an optical-to-electrical converter in the optical module.

However, a current Ethernet protocol IEEE 802.3 protocol defines only a delay reporting register interface at the PHY layer, and the interface is configured report a delay generated when a packet is transmitted at the PHY layer. However, for some optical modules, the PHY layer is implemented by both an interface chip and an optical module, that is, a PHY layer delay includes two parts: a PHY layer delay in the interface chip and a PHY layer delay in the optical module. In the protocol, only the PHY layer delay in the interface chip is reported, a delay added to a recorded timestamp includes only the PHY layer delay in the interface chip, and the PHY layer delay in the optical module is not recorded. Consequently, a timestamp obtained through addition is inaccurate, precision of time synchronization between a master clock and a slave clock is low, and clock precision of a network device is low.

In addition, precision of the PHY layer delay reporting function currently defined in the IEEE 802.3 protocol is low, and consequently the 1588 timestamp is inaccurate, and clock precision of a network device is low. Reasons for low delay reporting precision in the IEEE 802.3 are as follows: (1) Delay reporting precision is 1 ns. (2) The PHY layer includes a plurality of sublayers (for example, a PCS, PMA, and PMD), where a 1 ns loss is introduced when each sublayer reports a delay, and therefore total delay precision is N ns when N sublayers each report a delay.

Considering the foregoing problem, the embodiments of this application provide a communication method. After determining a first delay, a first optical module sends the determined first delay to an interface chip. Because a delay reporting register access interface is defined in the first optical module, the first optical module may report the first delay to the interface chip through the delay reporting register access interface, to add a delay generated when a packet is transmitted in the optical module to a recorded timestamp of the packet, so as to improve precision of time synchronization between a master clock and a slave clock, thereby further improving clock precision of a network device.

The following describes the technical solutions of the present invention in detail by using specific embodiments.

The following several specific embodiments may be combined with each other, and a same or similar concept or process may not be described in some embodiments.

Figure 3:
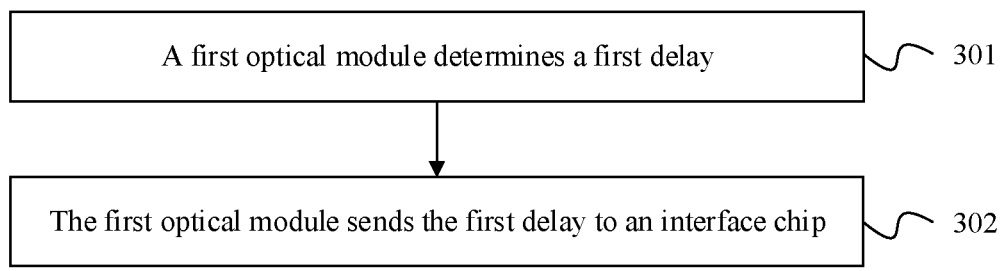
FIG. 3 is a schematic flowchart of a communication method according to an embodiment of this application.

FIG. 3 is a schematic flowchart of a communication method according to an embodiment of this application. As shown in FIG. 3, the method in this embodiment may include the following steps.

Step 301: A first optical module determines a first delay.

It can be learned from the foregoing formula (2) that, if delays in receiving and sending directions of an optical module are symmetric, a calculation result of a PTP timestamp before correction is the same as that of a corrected offset. For this optical module, delay reporting and correction may not be performed. Therefore, in an actual application, delay reporting and correction need to be performed on only an optical module for which delays in receiving and sending directions are asymmetric. Therefore, before a method in which the first optical module determines the first delay is described, a structure of an existing optical module and delay symmetry of the optical module are first described.

Figure 4:
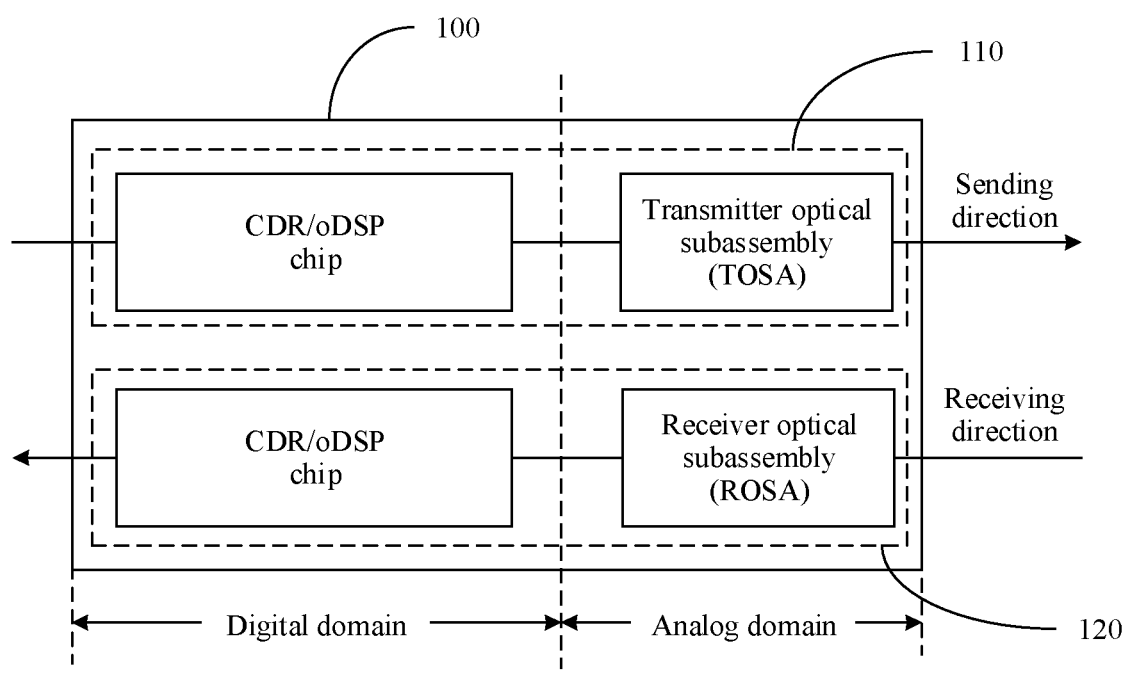
FIG. 4 is a schematic composition diagram of an optical module.

FIG. 4 is a schematic composition diagram of an optical module. As shown in FIG. 4, the optical module 100 includes two parts: an optical transmitter 110 and an optical receiver 120. In addition, the optical module 100 may be usually divided into two parts: a "digital domain" and an "analog domain". The "digital domain" includes a CDR chip or an oDSP chip, and mainly processes an analog signal and a digital signal. When processing circuits in receiving and sending directions are asymmetric, delay asymmetry is introduced. In addition, the "analog domain" includes a transmitter optical subassembly (TOSA) and a receiver optical subassembly (ROSA), including an edge connector, a printed circuit board (PCB) line, an optical-to-electrical converter, and the like. The "analog domain" is usually designed based on receiving and sending symmetry, a receiving delay and a sending delay are relatively fixed and symmetric, and precision of clock synchronization is not affected basically. Therefore, when a delay in the optical module needs to be determined, only a delay in the "digital domain" is usually considered.

It may be understood that, if the optical module uses the CDR chip, because the CDR chip processes a data flow by using only an analog signal circuit, and the receiving delay and the sending delay in the optical module are symmetric, delay determining and delay reporting do not need to be performed. For example, if the optical module uses the CDR chip, the delay in the optical module may be determined in the manner in this embodiment of this application, or the delay in the optical module may be designed as a default value or a design value.

If the optical module uses the oDSP chip, because the oDSP chip causes asymmetry between and uncertainties of the receiving delay and the sending delay, a delay generated when a packet is transmitted in the optical module affects clock precision of a network device. Therefore, the delay generated when the packet is transmitted in the optical module needs to be determined, and needs to be reported to an interface chip, so as to improve the clock precision of the network device. The following provides a description by using a specific example.

Figure 5:
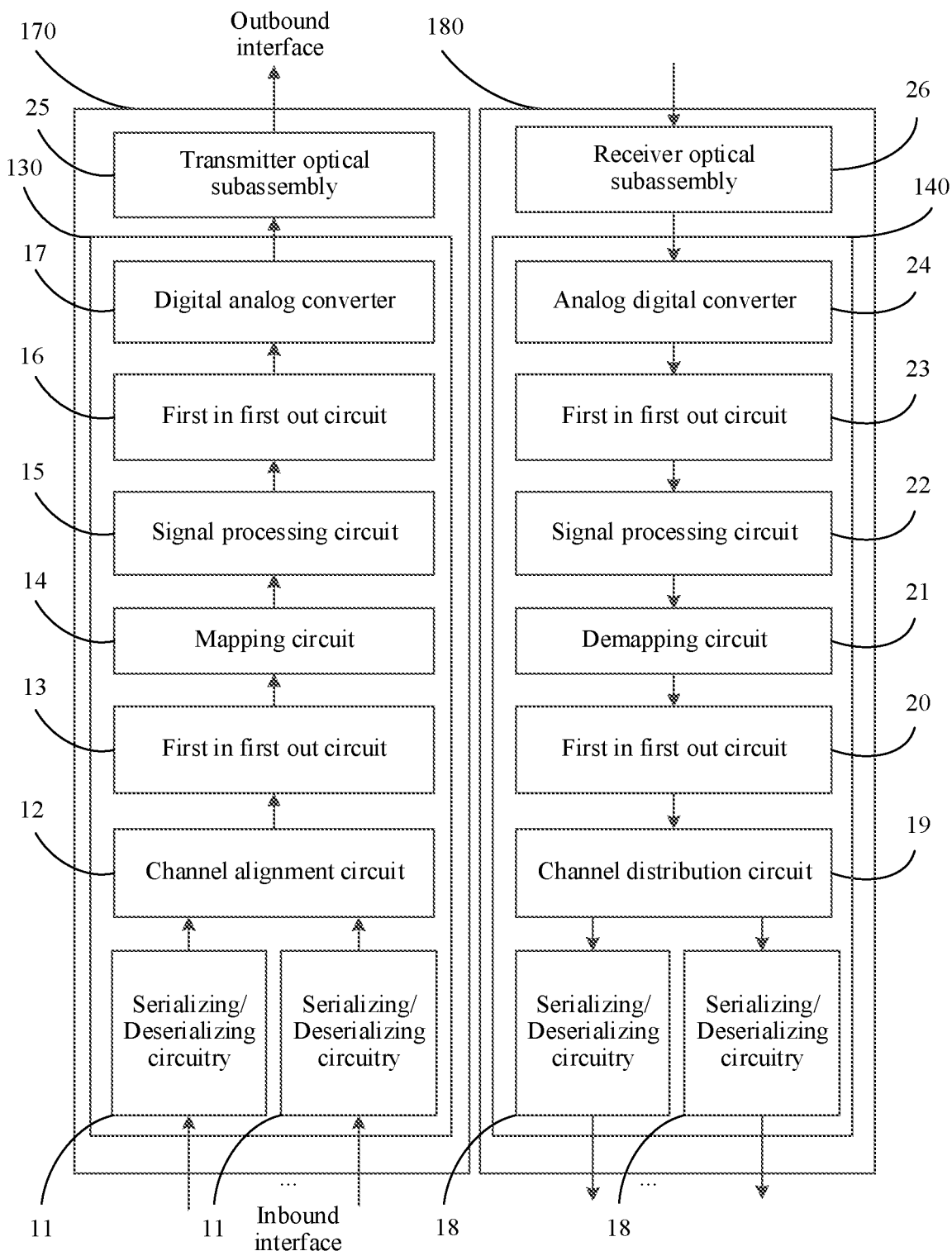
FIG. 5 is a schematic structural diagram of a gray optical module.

FIG. 5 is a schematic structural diagram of a gray optical module. As shown in FIG. 5, the gray optical module includes an optical transmitter 170 and an optical receiver 180. The optical transmitter 170 includes an oDSP chip 130 and a TOSA 25. The optical receiver 180 includes an oDSP chip 140 and an ROSA 26. The TOSA 25 and the ROSA 26 are connected to an optical fiber.

The oDSP chip 130 includes a serializing/deserializing circuitry (Serdes) 11, a channel alignment circuit 12, a first in first out (FIFO) circuit 13, a mapping circuit 14, a digital signal processing (DSP) circuit 15, an FIFO circuit 16, and a digital analog converter (DAC) 17 that are connected in sequence. The oDSP chip 140 includes a serializing/deserializing circuitry (Serdes) 18, a channel distribution circuit 19, an FIFO circuit 20, a demapping circuit 21, a DSP circuit 22, an FIFO circuit 23, and an analog digital converter (ADC) 24 that are connected in sequence.

For example, the mapping circuit 14 may be implemented by a four-level pulse amplitude modulation (PAM4) circuit or a bit interleaving (BitMux) circuit. Similarly, the demapping circuit 21 may be implemented by the PAM4 circuit or a bit de-interleaving (BitDeMux) circuit.

The circuits in the oDSP chip 130 and the oDSP chip 140 may cause asymmetry between and uncertainties of a receiving delay and a sending delay, and may cause a 10 ns (nanosecond) delay. Consequently, precision of clock synchronization between base stations is low, and clock precision of a network device is affected. Therefore, the gray optical module determines a delay generated when a packet is transmitted in the gray optical module, and reports the delay to an interface chip, so as to further improve the clock precision of the network device.

Figure 6:
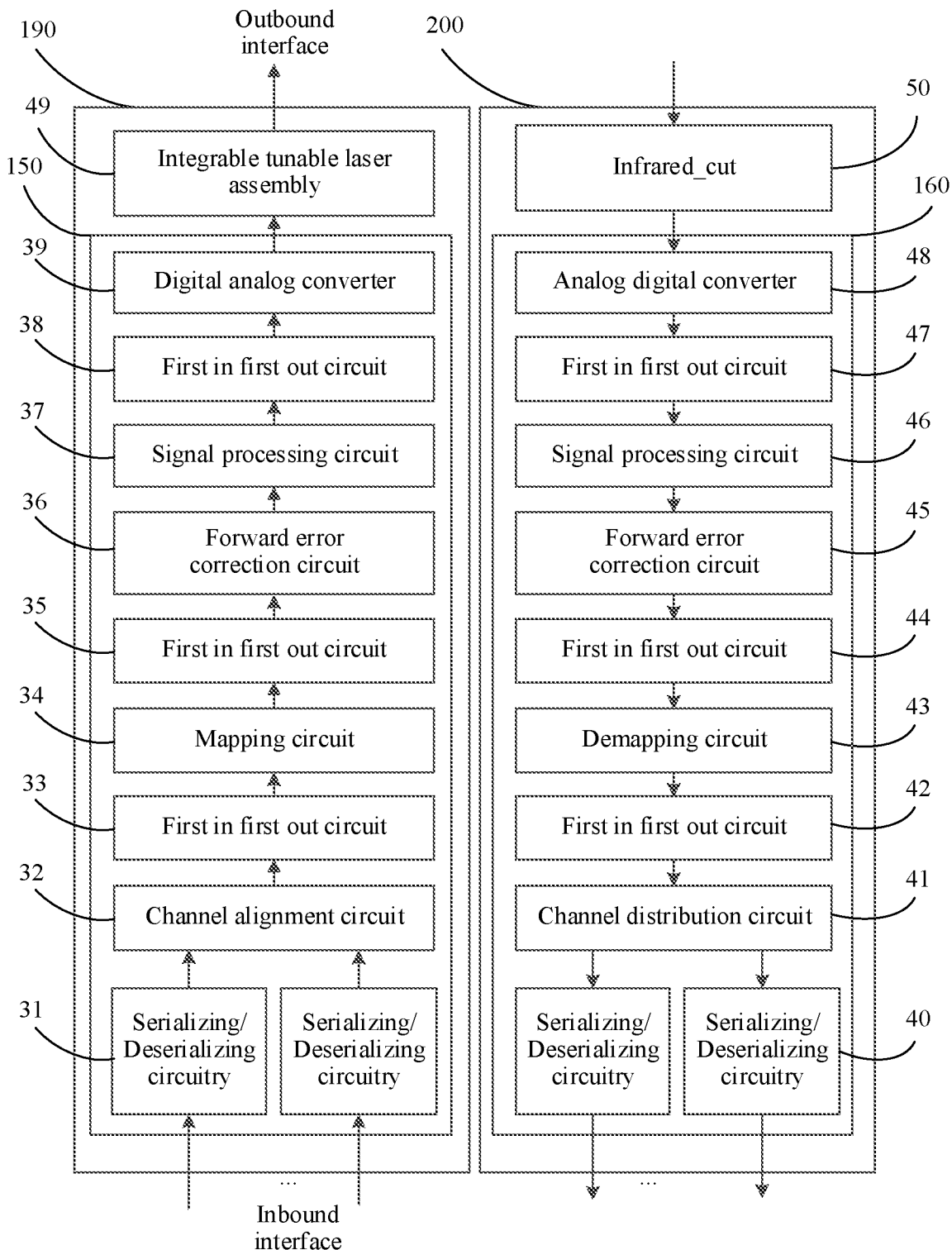
FIG. 6 is a schematic structural diagram of a colored optical module.

FIG. 6 is a schematic structural diagram of a colored optical module. As shown in FIG. 6, the colored optical module includes an optical transmitter 190 and an optical receiver 200. The optical transmitter 190 includes an oDSP chip 150 and an integrated tunable laser assembly (ITLA) 49. The optical receiver 200 includes an oDSP chip 160 and infrared_cut 50. The ITLA 49 and the infrared_cut 50 are connected to an optical fiber.

The oDSP chip 150 includes a serializing/deserializing circuitry (Serdes) 31, a channel alignment circuit 32, an FIFO circuit 33, a mapping circuit 34, an FIFO circuit 35, a forward error correction (forward error correction, FEC) circuit 36, a DSP circuit 37, an FIFO circuit 38, and a DAC 39 that are connected in sequence. The oDSP chip 160 includes a serializing/deserializing circuitry (Serdes) 40, a channel distribution circuit 41, an FIFO circuit 42, a demapping circuit 43, an FIFO circuit 44, an FEC circuit 45, a DSP circuit 46, an FIFO circuit 47, and an ADC 48 that are connected in sequence.

For example, the mapping circuit 34 may be implemented by a framer (Framer) or a bit interleaving (BitMux) circuit. Similarly, the demapping circuit 43 may be implemented by a deframer (DeFramer) or a bit de-interleaving (BitDeMux) circuit.

Compared with the gray optical module, the FEC circuits are added to the oDSP chip 150 and the oDSP chip 160 in the colored optical module. Therefore, there are more factors that cause uncertainties of a receiving delay and a sending delay, and about 10 ns synchronization precision is caused. Therefore, the colored optical module determines a delay generated when a packet is transmitted in the colored optical module, and reports the delay to an interface chip, so as to further improve clock precision of a network device.

Based on the foregoing content, the following separately describes a process in which a first optical module determines a first delay by using an example in which the first optical module is the foregoing gray optical module and an example in which the first optical module is the foregoing colored optical module.

With reference to FIG. 5, when the first optical module is the gray optical module, the first optical module includes an optical transmitter 170. The optical transmitter 170 includes an inbound interface and an outbound interface. In this case, the first optical module may receive a first data flow through the inbound interface, and send the first data flow to a second network device through the outbound interface. The first optical module determines that a delay generated when the first data flow is transmitted in the optical transmitter is the first delay.

The first delay may be the delay generated when the first data flow is transmitted in the optical transmitter 170 in the first optical module. It may be understood that, with reference to FIG. 5, because the optical transmitter 170 includes different processing circuits, the first delay may alternatively be a delay caused when each of the different processing circuits in the optical transmitter processes the first data flow.

Specifically, as shown in FIG. 5, the first delay may be a delay generated when the first data flow is transmitted from the inbound interface in the optical transmitter 170 to the outbound interface in the optical transmitter 170. The first delay may alternatively be a delay caused when at least one processing circuit included in the optical transmitter 170 processes the first data flow. Certainly, the first delay may alternatively be a sum of a delay caused when at least one processing circuit included in the optical transmitter 170 processes the first data flow and a default value or a design value. For example, the first delay may be a delay generated when the first data flow is transmitted from the serializing/deserializing circuitry 11 to the TOSA 25, or may be a delay caused when each processing circuit in the oDSP chip 130 processes the first data flow, or may be a sum of a delay caused when each of the channel alignment circuit 12, the FIFO circuit 13, the mapping circuit 14, the DSP circuit 15, and the FIFO circuit 16 in the oDSP chip 130 processes the first data flow and a default value or a design value.

For example, delay asymmetry and uncertainty may occur on the oDSP chip in the first optical module. Therefore, in an actual application, when a delay in the first optical module is calculated, only a delay corresponding to the oDSP chip needs to be determined.

The following describes in detail a method for determining the delay generated when the first data flow is transmitted in the oDSP chip in the gray optical module. Specifically, when the first data flow is transmitted to a first circuit, the first optical module extracts a first indication signal carried in the first data flow. When the first data flow is transmitted to a second circuit, the first optical module extracts a second indication signal carried in the first data flow. Then, the first optical module determines the first delay based on the first indication signal and the second indication signal. Because a structure of the first data flow does not change in a mapping process of the first data flow on a receiving path and in a demapping process of the first data flow a sending path, in a possible implementation, the first delay may be measured based on an alignment marker (alignment marker, AM) indication signal, that is, the first indication signal and the second indication signal may be AM indication signals. Certainly, in another possible implementation, the first indication signal and the second indication signal may alternatively be other easily identified signals, for example, identifiers inserted into the first data flow. Specific forms of the first indication signal and the second indication signal are not limited in this embodiment of this application, provided that the first indication signal and the second indication signal can be identified on the inbound interface and the outbound interface.

Further, when the first delay is determined based on the first indication signal and the second indication signal, a phase difference between the first indication signal and the second indication signal may be measured, and the first delay is determined based on the phase difference.

In addition, the first circuit and the second circuit may be any two different circuits in the oDSP chip. For example, the first circuit may be the channel alignment circuit 12 shown in FIG. 5, and the second circuit may be the FIFO circuit 16 shown in FIG. 5. In this case, a delay generated when the first data flow is transmitted from the channel alignment circuit 12 to the FIFO circuit 16 may be determined based on the phase difference between the first indication signal and the second indication signal. A delay corresponding to another circuit may be a default value or a design value. Alternatively, the first circuit may be the FIFO circuit 13, and the second circuit may be the FIFO circuit 16. In this case, a delay generated when the first data flow is transmitted from the FIFO circuit 13 to the FIFO circuit 16 may be determined based on the phase difference between the first indication signal and the second indication signal. Similarly, a delay corresponding to another circuit may be a default value or a design value.

The following provides a description by using an example in which the first circuit is the channel alignment circuit 12, the second circuit is the DAC 17, and both the first indication signal and the second indication signal are AM indication signals.

Figure 7:
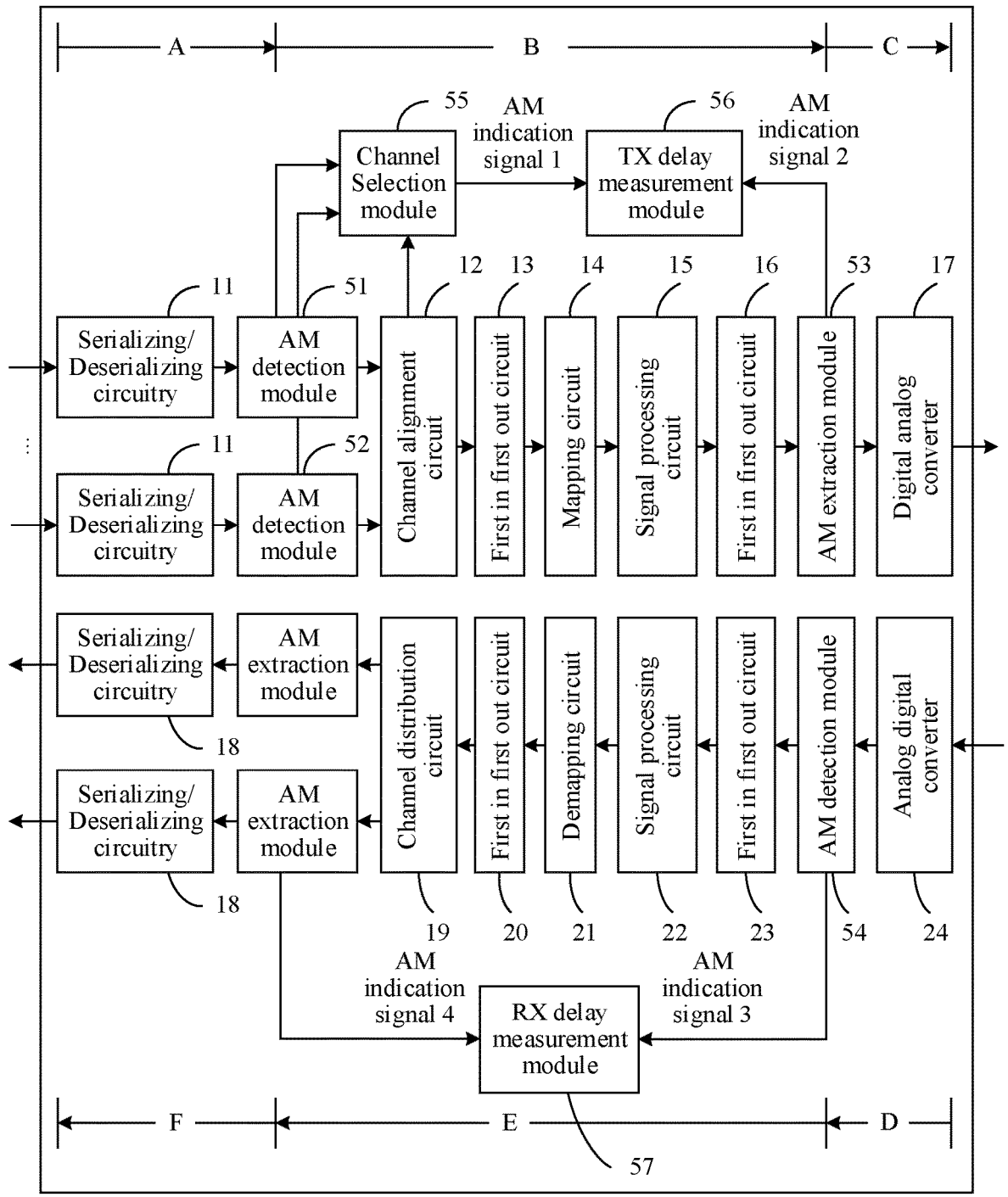
FIG. 7 is a schematic structural diagram of an oDSP chip in a gray optical module.

Specifically, FIG. 7 is a schematic structural diagram of an oDSP chip in a gray optical module. As shown in FIG. 7, the Serdes 11 and the DAC 17, or the Serdes 18 and the ADC 24 mainly implement conversion between serializing data and deserializing data, and each time the first optical module is powered on and a link status is stable, delays corresponding to the Serdes 11 and the DAC 17, or the Serdes 18 and the ADC 24 are relatively fixed, and are not affected by factors such as insertion and removal of an optical fiber or a module. Therefore, the delays corresponding to the Serdes 11 and the DAC 17, or the Serdes 18 and the ADC 24 (for example, a path A, a path F, a path C, and a path D in FIG. 7) may be preset design values, or may be simulation values obtained through simulation, or certainly may be default values.

In addition, the mapping circuit 14 and the demapping circuit 21 mainly implement mapping and demapping from a plurality of low-speed channels to high-speed channels. Because mapping is performed through bit interleaving, and a structure of the first data flow does not change, a delay of each bit data remains the same. However, due to factors such as insertion and removal of an optical fiber or a module, and a PVT (process, voltage, and temperature) change, a read/write clock phase for synchronously processing the FIFO circuits 13 and 16, or the FIFO circuits 20 and 23 changes, and consequently a delay corresponding to an FIFO circuit at each level is not fixed, and delay asymmetry is introduced. Therefore, each time a link of the first optical module is successfully established and a clock status changes, a delay in the oDSP chip needs to be measured. In a possible implementation, when a delay of a packet in the oDSP chip is measured, only a delay corresponding to a path B or a path E shown in FIG. 7 usually needs to be measured.

In other words, the delay of the packet in the oDSP chip in the optical transmitter is used as an example. In an actual application, when the first delay generated when the first data flow is transmitted from the inbound interface in the optical transmitter to the outbound interface in the optical transmitter is measured, only a delay of the first data flow on the path B may be measured. After the delay corresponding to the path B is measured, the delay corresponding to the path B, a delay corresponding to the path A, and a delay corresponding to the path C are added, to obtain the delay generated when the first data flow is transmitted in the optical transmitter.

For example, an example in which the first indication signal and the second indication signal are AM indication signals is used for description. As shown in FIG. 7, the first data flow arrives at the channel alignment circuit 12 through a plurality of channels. After the channel alignment circuit 12 performs channel alignment on the first data flow on the plurality of channels, a channel selection module 55 selects one channel from the plurality of channels, detects an AM indication signal 1 carried in the first data flow from the selected channel, and sends the detected AM indication signal 1 to a TX delay measurement module 56. In addition, to correctly extract the AM indication signal from the outbound interface in the optical transmitter, the AM indication signal further needs to be identified. The identified AM indication signal is carried in the first data flow and then transmitted. After it is detected that the first data flow is output from the FIFO circuit 16, that is, the first data flow is transmitted to the DAC 17, an AM extraction module 53 extracts, based on the foregoing identifier, an AM indication signal 2 carried in the first data flow from the channel from which the AM indication signal 1 is detected, and sends the detected AM indication signal 2 to the TX delay measurement module 56. In this case, the TX delay measurement module 56 may determine the delay of the first data flow on the path B by measuring a phase difference between the AM indication signal 1 and the AM indication signal 2 by using a high-precision phase discrimination algorithm. Measurement precision depends on precision of a phase discrimination algorithm. Generally, precision of a measured delay may reach a 100 ps level.

The AM indication signal 1 and the AM indication signal 2 are a same AM indication signal.

For example, after the delay of the first data flow on the path B is determined, the delay generated when the first data flow is transmitted in the optical transmitter may be obtained by obtaining the delay corresponding to the path A and the delay corresponding to the path C, and adding the delay corresponding to the path A, the delay corresponding to the path C, and the delay corresponding to the path B.

In addition, it should be noted that, to improve delay determining accuracy, when channel alignment is performed and one channel is selected from a plurality of channels to extract an AM indication signal, a channel on which the first data flow arrives at the channel alignment module last may be selected to extract the AM indication signal.

A person skilled in the art may understand that the delay generated when the first data flow is transmitted in the optical receiver of the first optical module may be a value obtained by adding a delay corresponding to the path D, the delay corresponding to the path E, and a delay corresponding to the path F. The delay corresponding to the path D and the delay corresponding to the path F are similar to the delay corresponding to the path C and the delay corresponding to the path A in the optical transmitter, and may be preset design values, or may be simulation values obtained through simulation, or certainly may be default values. A manner for determining the delay corresponding to the path E is similar to the manner for determining the delay corresponding to the path B in a sending direction. To be specific, when the first data flow is transmitted to a first circuit, an AM detection module 54 extracts an AM indication signal 3 carried in the first data flow. When the first data flow is transmitted to a second circuit, the AM extraction module extracts an AM indication signal 4 carried in the first data flow. An RX delay measurement module 57 may determine the delay corresponding to the path E by measuring a phase difference between the AM indication signal 3 and the AM indication signal 4. The first circuit may be the FIFO circuit, and the second circuit may be the serializing/deserializing circuitry 18. For a channel selection process and an AM indication signal extraction process, refer to descriptions in the optical transmitter. Details are not described herein again.

Further, considering difference of chip implementation, when the gray optical module does not have a function of measuring the delay corresponding to the path B and the delay corresponding to the path E, the delay corresponding to the path B and the delay corresponding to the path E may be preset design values, or may be simulation values obtained through simulation, or certainly may be default values. In addition, because an actual delay corresponding to the path B and an actual delay corresponding to the path E change each time a link of the first optical module is successfully established and a clock status changes, the preset design values, the simulation values, or the default values are not accurate enough. To resolve this problem, in an actual application, the preset design values are used as an example. An average value of the design values may be calculated, and the average value is used as the delay corresponding to the path B and the delay corresponding to the path E. Alternatively, a minimum design value and a maximum design value are determined, and the determined minimum design value and the determined maximum design value are used as the delay corresponding to the path B and the delay corresponding to the path E, to report the two values to an interface chip. Manners for determining the simulation values and the default values are similar to the manner for determining the design values. Details are not described herein again.

With reference to FIG. 6, when the first optical module is the colored optical module, because an overhead processing circuit such as a framer (Framer) or an FEC circuit is disposed inside the colored optical module, overhead addition or deletion changes a structure of an original data flow. Consequently, a delay of each bit data varies during overhead addition (at a transmit end) and overhead deletion (at a receive end) process. Because each bit data received by the first optical module may be a PTP packet timestamping signal, a delay when the first optical module is used as a transmit end, or a delay when the first optical module is used as a receive end cannot be individually measured because of such an unfixed delay. However, a person skilled in the art may understand that a delay change caused by data mapping at the transmit end and a delay change caused by data demapping at the receive end are opposite processes, that is, a sum of delays of one piece of bit data at the transmit end and the receive end is fixed. Therefore, in this embodiment of this application, the first optical module and a second optical module may be paired for delay measurement.

The first optical module is a colored optical module in a first network device, and the second optical module is a colored optical module in a second network device. The first optical module includes an optical transmitter and a first optical receiver, and the first optical module receives a first data flow by using the optical transmitter. A delay generated when the first data flow is transmitted in the optical transmitter is a second delay. Then, the first optical module sends the first data flow to a second optical receiver in the second optical module in the second network device by using the optical transmitter. A delay generated when the first data flow is transmitted in the second optical receiver is a third delay. A sum of the second delay and the third delay is the foregoing first delay. The first optical module receives, by using the first optical receiver, a second data flow sent by the second network device. The second data flow carries indication information. Correspondingly, the first optical module may determine the first delay based on the indication information carried in the second data flow.

Figure 8A:
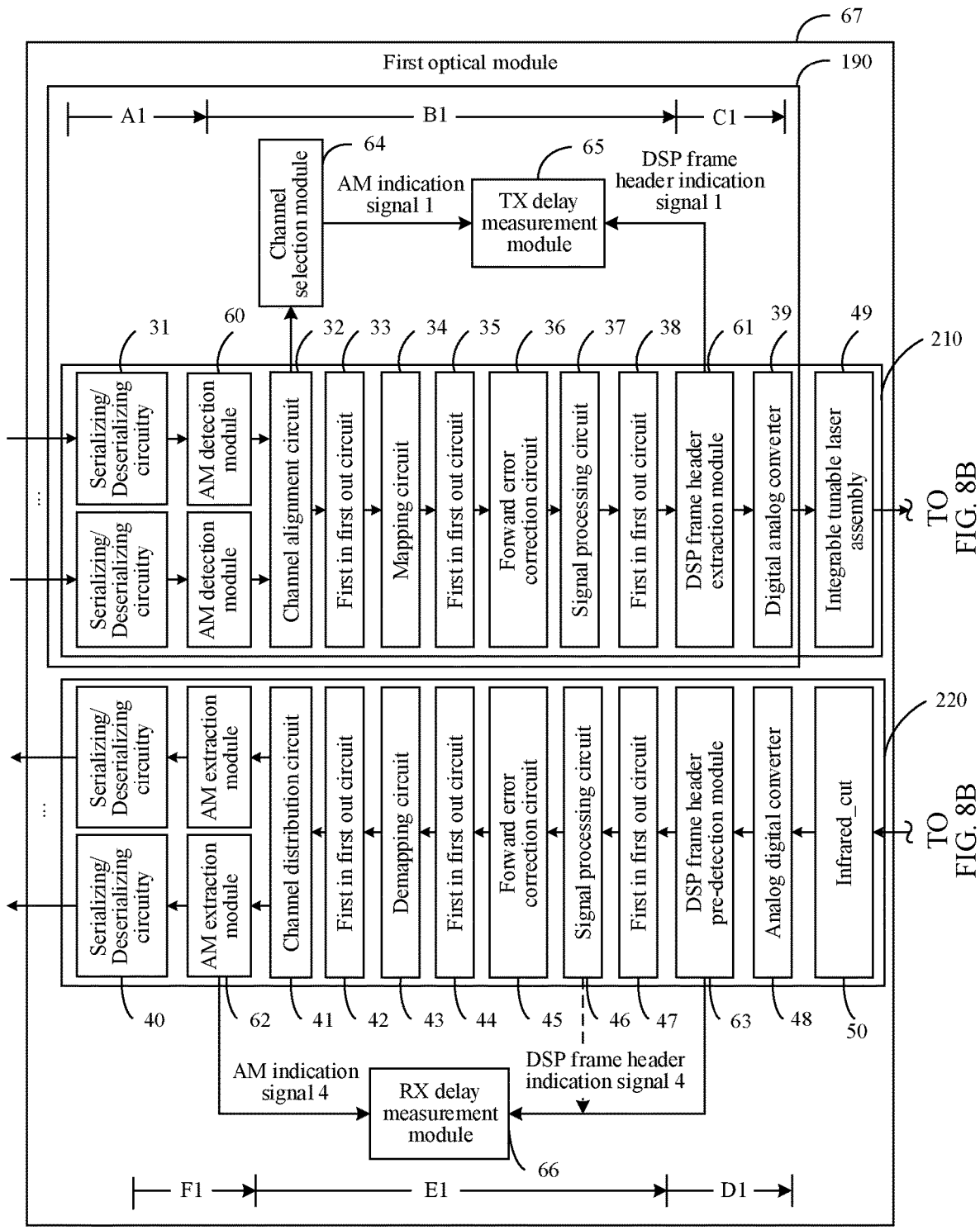
FIG. 8A and FIG. 8B are a schematic structural diagram of an oDSP chip in a colored optical module.
Figure 8B:
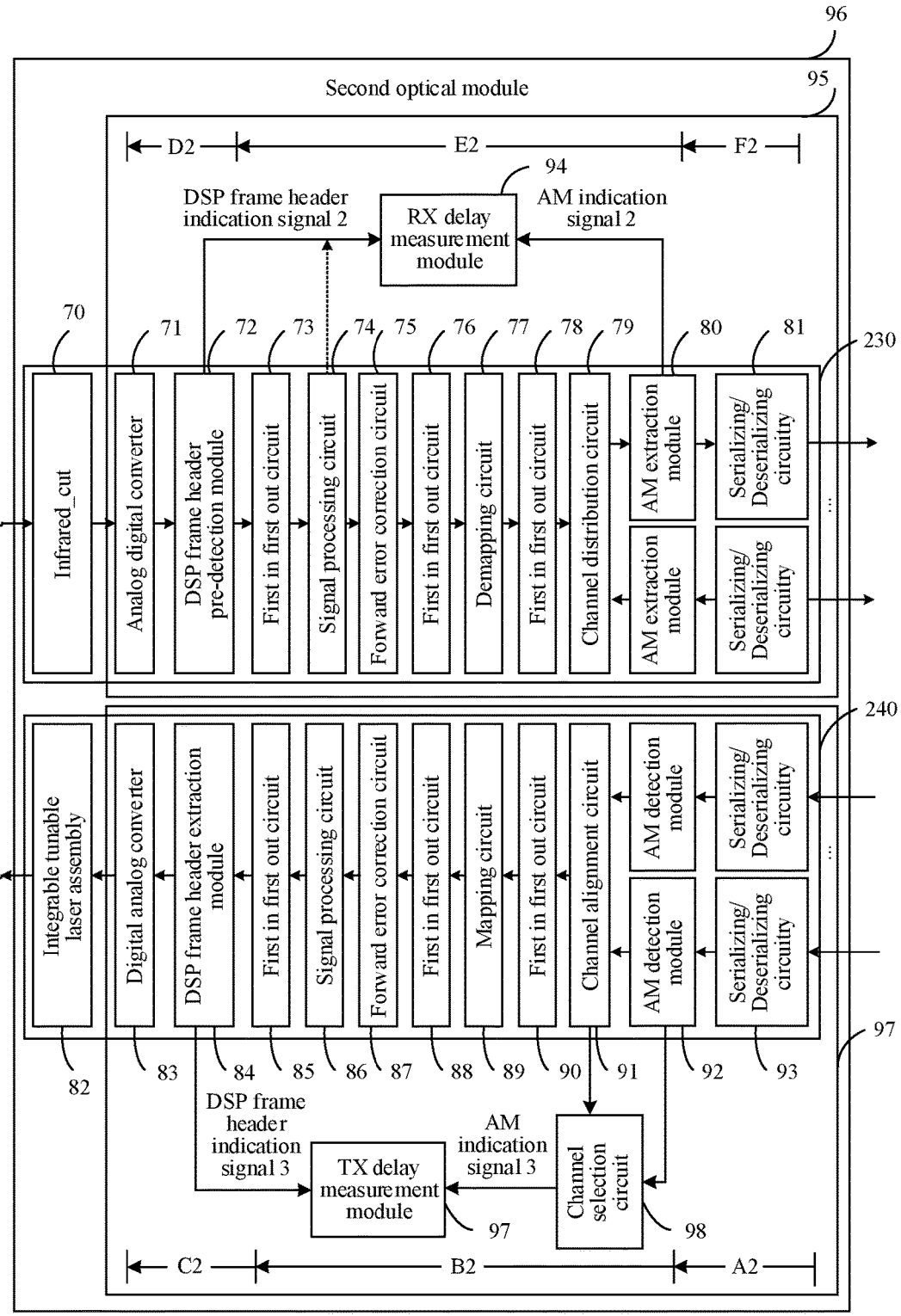

Specifically, FIG. 8A and FIG. 8B are a schematic structural diagram of an oDSP chip in a colored optical module. As shown in FIG. 8A and FIG. 8B, a first optical module 67 is a colored optical module in the first network device, and includes an optical transmitter 210 and an optical receiver 220. The first optical module 67 receives a first data flow by using the optical transmitter 210, and then sends the first data flow to a second optical receiver 230 in a second optical module 96 in the second network device by using the optical transmitter 210. Therefore, a second delay generated when the first data flow is transmitted in the optical transmitter 210 in the first optical module 67 and a third delay generated when the first data flow is transmitted in the optical receiver 230 in the second optical module 96 may be measured based on the first data flow.

The second optical module 96 includes an optical transmitter 240 and the optical receiver 230. The optical transmitter 240 includes an oDSP chip 97 and an ITLA 82, and the optical receiver 230 includes an oDSP chip 95 and infrared_cut 70. The ITLA 82 and the infrared_cut 70 are connected to an optical fiber.

The oDSP chip 97 includes a serializing/deserializing circuitry (serializing/deserializing circuitry, Serdes) 93, a channel alignment circuit 91, an FIFO circuit 90, a mapping circuit 89, an FIFO circuit 88, a forward error correction FEC circuit 87, a DSP circuit 86, an FIFO circuit 85, and a DAC 83 that are connected in sequence. The oDSP chip 95 includes an ADC 71, an FIFO circuit 73, a DSP circuit 74, an FEC circuit 75, an FIFO circuit 76, a demapping circuit 77, an FIFO circuit 78, a channel distribution circuit 79, and a serializing/deserializing circuitry (Serdes) 81 that are connected in sequence.

For example, the mapping circuit 89 may be implemented by a framer (Framer) or a bit interleaving (BitMux) circuit. Similarly, the demapping circuit 77 may be implemented by a deframer (DeFramer) or a bit de-interleaving (BitDeMux) circuit.

It may be understood that, with reference to FIG. 8A and FIG. 8B, because the transmitter 210 in first optical module includes different processing circuits, the second delay may be a delay caused when each of the different processing circuits in the transmitter 210 processes the first data flow. Similarly, because the optical receiver 230 in the second optical module also includes different processing circuits, the third delay may be a delay caused when each of the different processing circuits in the optical receiver 230 processes the first data flow.

Specifically, as shown in FIG. 8A and FIG. 8B, the second delay may be a delay generated when the first data flow is transmitted from an inbound interface in the optical transmitter 210 to an outbound interface in the optical transmitter 210, or may be a delay caused when at least one processing circuit included in the optical transmitter 210 processes the first data flow, or certainly may be a sum of a delay caused when at least one processing circuit included in the optical transmitter 210 processes the first data flow and a default value or a design value. For example, the second delay may be a delay generated when the first data flow is transmitted from the serializing/deserializing circuitry 31 to the TOSA 49, or may be a delay caused when each processing circuit in the oDSP chip 190 processes the first data flow, or may be a sum of a delay caused when each of the channel alignment circuit 32, the FIFO circuit 33, the mapping circuit 34, the FIFO circuit 35, the FEC circuit 36, the DSP circuit 37, and the FIFO circuit 38 in the oDSP chip 190 processes the first data flow and a default value or a design value.

The third delay may be a delay generated when the first data flow is transmitted from an inbound interface in the second optical receiver 230 to an outbound interface in the second optical module 230, or may be a delay caused when at least one processing circuit included in the second optical receiver 230 processes the first data flow, or certainly may be a sum of a delay caused when at least one processing circuit included in the second optical receiver 230 processes the first data flow and a default value or a design value. For example, the third delay may be a delay generated when the first data flow is transmitted from the infrared_cut 70 to the serializing/deserializing circuitry 81, or may be a delay caused when each processing circuit in the oDSP chip 95 processes the first data flow, or may be a sum of a delay caused when each of the DAC 71, the FIFO circuit 73, the DSP circuit 74, the FEC circuit 75, the FIFO circuit 76, the demapping circuit 77, the FIFO circuit 78, and the channel distribution circuit 79 in the oDSP chip 95 processes the first data flow and a default value or a design value.

Similarly to the gray optical module, delay asymmetry and uncertainty may occur on the oDSP chips in the first optical module and the second optical module. Therefore, in an actual application, when delays in the first optical module and the second optical module are calculated, only delays corresponding to the oDSP chips in the first optical module and the second optical module need to be determined.

The following describes in detail the delay generated when the first data flow is transmitted in the oDSP chip in the first optical module and the delay generated when the first data flow is transmitted in the oDSP chip in the second optical module.

Specifically, it is assumed that the first data flow is transmitted in the first optical module. When the first data flow is transmitted to a first circuit, the first optical module extracts a first indication signal carried in the first data flow. When the first data flow is transmitted to a second circuit, the first optical module extracts a second indication signal carried in the first data flow. Then, the first optical module may determine, based on the first indication signal and the second indication signal, the second delay generated when the first data flow is transmitted in the optical transmitter 210 in the first optical module 67.

Further, it is assumed that the first data flow is transmitted in the second optical module. When the first data flow is transmitted to a third circuit, the second optical module extracts a third indication signal carried in the first data flow. When the first data flow is transmitted to a fourth circuit, the second optical module extracts a fourth indication signal carried in the first data flow. Then, the second optical module determines, based on the third indication signal and the fourth indication signal, the third delay generated when the first data flow is transmitted in the second optical receiver 230 in the second optical module 96.

In addition, the first circuit and the second circuit may be any two different circuits in the oDSP chip 190. For example, the first circuit may be the channel alignment circuit 32 shown in FIG. 8A and FIG. 8B, and the second circuit may be the FIFO circuit 38 shown in FIG. 8A and FIG. 8B. In this case, a delay generated when the first data flow is transmitted from the channel alignment circuit 32 to the FIFO circuit 38 may be determined based on a phase difference between the first indication signal and the second indication signal. A delay corresponding to another circuit may be a default value or a design value. Alternatively, the first circuit may be the FIFO circuit 33, and the second circuit may be the FIFO circuit 38. In this case, a delay generated when the first data flow is transmitted from the FIFO circuit 33 to the FIFO circuit 38 may be determined based on a phase difference between the first indication signal and the second indication signal. Similarly, a delay corresponding to another circuit may be a default value or a design value.

Similarly, the third circuit and the fourth circuit may be any two different circuits in the oDSP chip 95. For example, the third circuit may be the FIFO circuit 73 shown in FIG. 8A and FIG. 8B, and the fourth circuit may be the serializing/deserializing circuitry 81 shown in FIG. 8A and FIG. 8B. In this case, a delay generated when the first data flow is transmitted from the FIFO circuit 73 to the serializing/deserializing circuitry 81 may be determined based on a phase difference between the first indication signal and the second indication signal. A delay corresponding to another circuit may be a default value or a design value. Alternatively, the third circuit may be the signal processing circuit 74, and the fourth circuit may be the serializing/deserializing circuitry 81. In this case, a delay generated when the first data flow is transmitted from the signal processing circuit 74 to the serializing/deserializing circuitry 81 may be determined based on a phase difference between the first indication signal and the second indication signal. Similarly, a delay corresponding to another circuit may be a default value or a design value.

With reference to FIG. 8A and FIG. 8B, a sending direction in which the first optical module 67 sends the first data flow to the second optical module 96 is used as an example. Delays corresponding to a path A1 and a path C1 in the first optical module 67, and delays corresponding to a path D2 and a path F2 in the second optical module 96 are similar to delays corresponding to the Serdes 11 and the DAC 17, or the Serdes 18 and the ADC 24 in the gray optical module, and may be preset design values, or may be simulation values obtained through simulation, or certainly may be default values. Therefore, when the second delay generated when the first data flow is transmitter in the optical transmitter 210 in the first optical module 67 is measured, only a delay corresponding to a path B1 needs to be measured. When the third delay generated when the first data flow is transmitted in the second optical receiver 230 in the second optical module 96 is measured, only a delay corresponding to a path E2 needs to be measured.

Specifically, when the delay corresponding to the path B1 is measured, an example in which the first circuit is the channel alignment circuit 32, the second circuit is the DAC 39, the first indication signal is an AM indication signal, and the second indication signal is a DSP frame header signal is used for description. As shown in FIG. 8A and FIG. 8B, the first data flow arrives at the channel alignment circuit 32 in the first optical module 67 through a plurality of channels. After the channel alignment circuit 32 performs channel alignment on the first data flow on the plurality of channels, a channel selection module 64 selects one channel from the plurality of channels. When the first data flow is transmitted to the channel alignment circuit 32, an AM detection module 60 detects an AM indication signal 1 carried in the first data flow from the selected channel, and sends the detected AM indication signal 1 to a TX delay measurement module 65. In addition, to correctly extract the AM indication signal from the outbound interface in the optical transmitter 230 in the second optical module 96, the AM indication signal further needs to be identified. The identified AM indication signal is carried in the first data flow and then transmitted. The inbound interface in the optical transmitter 210 in the first optical module 67 periodically extracts a DSP frame header indication signal 1. For example, after the first data flow is transmitted to the DAC 39, a DSP frame header extraction module 61 extracts the DSP frame header indication signal 1 carried in the first data flow, and sends the extracted DSP frame header indication signal 1 to the TX delay measurement module 65. In this case, the TX delay measurement module 65 may determine the delay of the first data flow on the path B1 by measuring a phase difference between the AM indication signal 1 and the DSP frame header indication signal 1 by using a high-precision phase discrimination algorithm. Measurement precision depends on precision of a phase discrimination algorithm. Generally, precision of a measured delay may reach a 100 ps level.

It should be noted that, because a period of an AM indication signal is different from a period of a DSP frame header indication signal, no fixed phase relationship exists between the AM indication signal and the DSP frame header indication signal. For ease of pairing and measuring, two adjacent signals need to be selected from the AM indication signal and the DSP frame header indication signal for measurement. For example, if the period of the AM indication signal is 3 ms, and the period of the DSP frame header indication signal is 1.2 ms, one AM indication signal may appear in the first data flow after two DSP frame header indication signals. In this case, an AM indication signal and a DSP frame header indication signal adjacent to the AM indication signal, for example, the AM indication signal and the second DSP frame header indication signal may be selected for measurement, and a phase difference between the two signals is measured.

In addition, to correctly extract the DSP frame header indication signal from the inbound interface in the second optical receiver 230 in the second optical module 96, identification information further needs to be added to the DSP frame header indication signal, and the first data flow to which the identification information is added is sent to the second optical module 96 through an optical fiber.

Similarly, when the delay corresponding to the path E2 is measured, an example in which the third circuit is the FIFO circuit 73, the fourth circuit is the serializing/deserializing circuitry 81, the third indication signal is a DSP frame header indication signal, and the fourth indication signal is an AM indication signal is used for description. As shown in FIG. 8A and FIG. 8B, after the first optical module 67 sends the first data flow to the second optical receiver 230 in the second optical module 96 by using the optical transmitter 210, the ADC 71 in the second optical module 96 transmits the first data flow to the FIFO circuit 73. Then, a DSP frame header pre-detection module 72 extracts a DSP frame header indication signal 2 based on identification information added to the DSP frame header indication signal in the optical transmitter 210 in the first optical module 67, and sends the extracted DSP frame header indication signal 2 to an RX delay measurement module 94. In this case, the first data flow continues to be transmitted. After it is detected the first data flow is transmitted to the serializing/deserializing circuitry 81, an AM extraction module 80 extracts, from a channel based on identification information added to the AM in the optical transmitter 210 in the first optical module 67, an AM indication signal 2 carried in the first data flow, and sends the extracted AM indication signal 2 to the RX delay measurement module 94. In this case, the RX delay measurement module 94 may determine the delay of the first data flow on the path E2 by measuring a phase difference between the DSP frame header indication signal 2 and the AM indication signal 2 by using a high-precision phase discrimination algorithm. Measurement precision depends on precision of a phase discrimination algorithm. Generally, precision of a measured delay may reach a 100 ps level.

The AM indication signal 1 and the AM indication signal 2 are a same AM indication signal. The DSP frame header indication signal 1 and the DSP frame header indication signal 2 are a same indication signal.

In addition, other easily identified data identifiers may also be used for the second indication information and the fourth indication information. For example, a new identifier is inserted into the first data flow. Specific forms of the second indication information and the fourth indication information are not limited in this embodiment of this application.

For example, after the delay of the first data flow on the path B1 is determined, the second delay generated when the first data flow is transmitted in the optical transmitter in the first optical module may be obtained by obtaining the delay corresponding to the path A1 and the delay corresponding to the path C1 and adding the delay corresponding to the path A1, the delay corresponding to the path C1, and the delay corresponding to the path B1.

For example, after the delay of the first data flow on the path E2 is determined, the third delay generated when the first data flow is transmitted in the second optical receiver in the second optical module may be obtained by obtaining the delay corresponding to the path D2 and the delay corresponding to the path F2 and adding the delay corresponding to the path D2, the delay corresponding to the path E2, and the delay corresponding to the path F2.

It should be noted that, after determining the second delay generated when the first data flow is transmitted in the optical transmitter 210, the first optical module sends the first data flow including the second delay to the second optical receiver 230 in the second optical module 96. After determining the third delay generated when the first data flow is transmitted in the second receiver 230, the second optical module determines a sum of the obtained second delay and the obtained third delay as the first delay.

In a possible implementation, after determining the first delay, the second optical receiver 230 in the second optical module sends a second data flow to the first optical receiver 220 in the first optical module 67. The second data flow carries indication information. Therefore, the first optical module may determine the first delay based on the indication information. In a possible implementation, the indication information includes the first delay. After receiving the indication information in the second data flow by using the first optical receiver 220, the first optical module 67 may directly determine the first delay.

It should be noted that, similar to the gray optical module, if the colored optical module does not have a function of measuring the delay corresponding to the path B1 and the delay corresponding to the path E2, the delay corresponding to the path B1 and the delay corresponding to the path E2 may be preset design values, or may be simulation values obtained through simulation, or certainly may be default values.

A person skilled in the art may understand that, when the second optical module 96 sends the first data flow to the first optical receiver 220 in the first optical module 67 by using the optical transmitter 240, the first delay may be a sum of a delay generated when the first data flow is transmitted in the optical transmitter 240 in the second optical module 96 and a delay generated when the first data flow is transmitted in the first optical receiver 220 in the first optical module 67. The delay generated when the first data flow is transmitted in the optical transmitted 240 in the second optical module 96 is a sum of a delay corresponding to a path A2, a delay corresponding to a path B2, and a delay corresponding to a path C2. The delay generated when the first data flow is transmitted in the first optical receiver 220 in the first optical module 67 is a sum of a delay corresponding to a path D1, a delay corresponding to a path E1, and a delay corresponding to a path F1. The delay corresponding to the path A2, the delay corresponding to the path C2, the delay corresponding to the path D1, and the delay corresponding to the path F1 are similar to the delay corresponding to the path A1, the delay corresponding to the path C1, the delay corresponding to the path D2, and the delay corresponding to the path F2, and may be preset design values, or may be simulation values obtained through simulation, or certainly may be default values. A manner of determining the delay corresponding to the path B2 in the optical transmitter 240 in the second optical module 96 and the delay corresponding to the path E1 in the first optical receiver 220 in the first optical module 67 is similar to the manner of determining the delay corresponding to the path B1 in the optical transmitter 210 in the first optical module 67 and the delay corresponding to the path E2 in the second optical receiver 230 in the second optical module 96. Details are not described herein again.

Step 202: The first optical module sends the first delay to the interface chip.

In this embodiment, because a delay reporting register access interface is defined in the first optical module, after determining the first delay, the first optical module sends the first delay to the interface chip through the delay reporting register access interface, so that the interface chip adds the first delay to a recorded timestamp. Therefore, the timestamp recorded by an MDI layer includes a delay generated when a packet is transmitted in the optical module, so that the timestamp recorded by the MDI layer is more accurate, precision of time synchronization between a master clock and a slave clock can be higher, and clock precision of a network device can be further improved.

In a possible implementation, the interface chip includes at least one of a PHY chip and a MAC chip.

In a possible implementation, the delay reporting register access interface in the first optical module may be defined in a manner in the following table.

| Sequence number | Interface signal | Interface bit width | Interface attribute | Definition | Optical module that does not support delay reporting | Optical module that supports delay reporting |
|---|---|---|---|---|---|---|
| 1 | Identifier of a delay reporting function of an optical module | 1 bit | RO (read-only register) | 0: The optical module does not support a delay reporting function. 1: The optical module supports a delay reporting function. | Fixed value 0 | Fixed value 1 |
| 2 | Whether a delay reporting value of an optical module is valid | 1 bit | RO | 0: invalid 1: valid | Fixed value 0 | (1) For a module that supports delay measurement: a measurement result is valid and set to 1; otherwise, the measurement result is set to 0. (2) For a module that does not support delay measurement: a measurement result is set to the fixed value 1. |
| 3 | Maximum TX delay value | 32 bits | RO | Maximum TX delay value (in a unit of 0.1 ns). When the value exceeds a maximum boundary value, the boundary value is filled in. | Fixed value 0 | When the delay reporting value of the optical module is invalid, the value is set to 0. When the delay reporting value of the optical module is valid: (1) For a module that supports delay measurement, a measurement result is filled in. (2) For a module that does not support delay measurement: a design value is always filled in. |
| 4 | Minimum TX delay value | 32 bits | RO | Minimum TX delay value (in a unit of 0.1 ns). When the value exceeds the maximum boundary value, the boundary value is filled in. | Fixed value 0 | |
| 5 | Maximum RX delay value | 32 bits | RO | Maximum RX delay value (in a unit of 0.1 ns). When the value exceeds the maximum boundary value, the boundary value is filled in. | Fixed value 0 | |
| 6 | Minimum RX delay value | 32 bits | RO | Minimum RX delay value (in a unit of 0.1 ns). | Fixed value 0 | |

| Sequence number | Interface signal | Interface bit width | Interface attribute | Definition | Optical module that does not support delay reporting | Optical module that supports delay reporting |
|---|---|---|---|---|---|---|
| | | | | When the value exceeds the maximum boundary value, the boundary value is filled in. | | |

The interface bit width is used to represent a quantity of bits of the interface signal. For the optical module that does not support delay reporting, the reporting value of the delay reporting register access interface is the fixed value 0. The optical module that supports delay reporting may be further classified into two types: the optical module that does not support delay measurement and the optical module that supports delay measurement. A first delay reported by the optical module that does not support delay measurement is a design value of an oDSP chip. A first delay reported by the optical module that supports delay measurement is a measured value obtained based on the indication information.

Further, if the first optical module is a gray optical module, after determining the first delay, the first optical module may report the first delay to the interface chip through the foregoing defined interface. After receiving the first delay, the interface chip may add the first delay and a delay generated when a packet is transmitted on a MAC layer or a PHY layer to a timestamp recorded by the MAC layer or the PHY layer. Therefore, an asymmetry error caused by the optical module can be greatly reduced, so that the timestamp recorded by the MDI layer is more accurate, precision of time synchronization between a master clock and a slave clock can be higher, and clock precision of a network device can be further improved.

If the first optical module is a colored optical module, the first delay is a sum of a delay generated when the first data flow is transmitted in the optical transmitter in the first optical module and a delay generated when the first data flow is transmitted in the second optical receiver in a second optical module. In an implementation, if the second optical module sends the measured first delay to the first optical module by using the second data flow, the first optical module may report the first delay to the interface chip through the delay reporting register access interface defined in the first optical module. In this case, the second optical module may report the first delay to the interface chip through a delay reporting register access interface defined in the second optical module, or may report 0 or a special identifier. Certainly, the second optical module may not perform reporting.

In another implementation, if the second optical module reports the first delay to the interface chip through a delay reporting register access interface defined in the second optical module, the first optical module may report the first delay through the delay reporting register access interface defined in the first optical module, or may report 0 or report a special identifier. Certainly, the first optical module may not perform reporting.

In still another implementation, the first optical module and the second optical module may divide the first delay into two parts according to a preset rule. The first part is reported by the first optical module to the interface chip through the delay reporting register access interface defined in the first optical module, and the second part is reported by the second optical module to the interface chip through the delay reporting register access interface defined in the second optical module.

According to the communication method provided in this embodiment of this application, after determining the first delay, the first optical module sends the determined first delay to the interface chip. Because the delay reporting register access interface is defined in the first optical module, the first optical module may report the first delay to the MAC layer or the PHY layer through the delay reporting register access interface, to add the first delay to the timestamp of the packet that is recorded by the MAC layer or the PHY layer, so as to improve precision of time synchronization between the master clock and the slave clock, thereby further improving clock precision of the network device.

The foregoing describes the communication method provided in the embodiments of this application. The following describes an optical module provided in the embodiments of this application.

The optical module provided in the embodiments of this application is used as a first optical module, and may be configured to perform an action related to the first optical module in the foregoing method embodiment. The optical module includes a processor 101.

The processor 101 is configured to determine a first delay.

The processor 101 is further configured to send the first delay to an interface chip.

After determining the first delay, the optical module provided in the embodiments of this application sends the determined first delay to the interface chip. Because a delay reporting register access interface is defined in the optical module, the optical module may report the first delay to a MAC layer or a PHY layer through the delay reporting register access interface, to add the first delay to a timestamp of a packet that is recorded by the MAC layer or the PHY layer, so as to improve precision of time synchronization between a master clock and a slave clock, thereby further improving clock precision of a network device.

Figure 9:
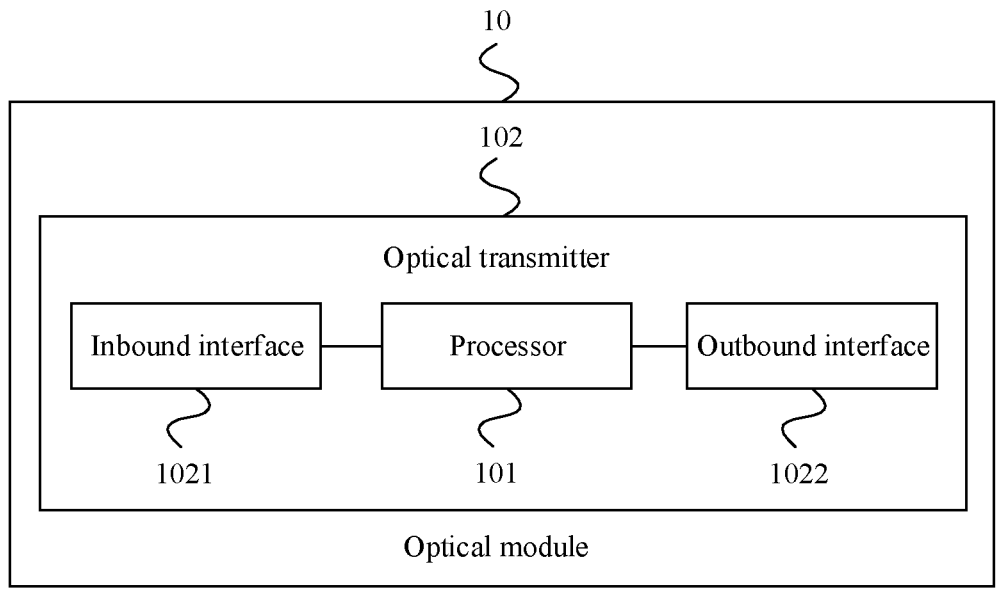
FIG. 9 is a schematic structural diagram of an optical module according to an embodiment of this application.

FIG. 9 is a schematic structural diagram of an optical module according to an embodiment of this application. Referring to FIG. 9, the first optical module 10 is a gray optical module. The first optical module 10 includes an optical transmitter 102. The optical transmitter 102 includes the processor 101, an inbound interface 1021, and an outbound interface 1022.

The optical transmitter 102 is configured to receive a first data flow through the inbound interface 1021.

The optical transmitter 102 is further configured to send the first data flow to a second network device through the outbound interface 1022.

The processor 101 is further configured to determine that a delay generated when the first data flow is transmitted in the optical transmitter 102 is the first delay.

Figure 10:
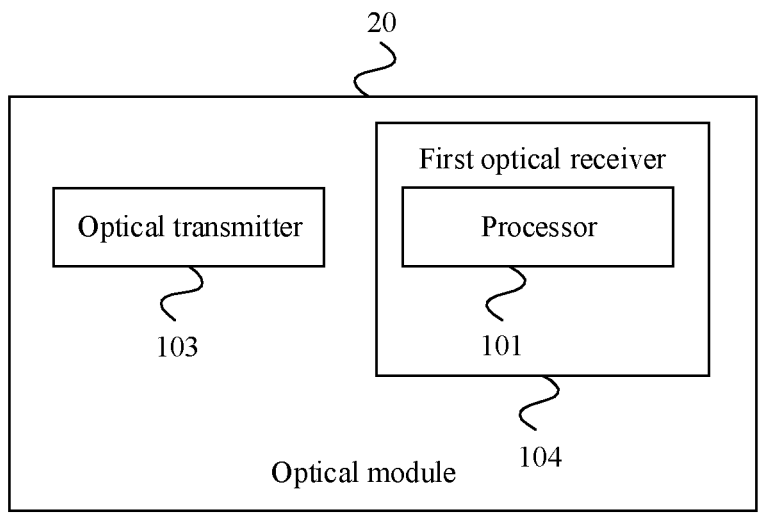
FIG. 10 is a schematic structural diagram of another optical module according to an embodiment of this application.

FIG. 10 is a schematic structural diagram of another optical module according to an embodiment of this application. Referring to FIG. 10, the first optical module 20 is a colored optical module in a first network device. The first optical module 20 includes an optical transmitter 103 and a first optical receiver 104. The first optical receiver 104 includes the processor 101.

The optical transmitter 103 is configured to receive a first data flow. A delay generated when the first data flow is transmitted in the optical transmitter 103 is a second delay.

The optical transmitter 103 is further configured to send the first data flow to the second optical receiver in a second optical module in a second network device. A delay generated when the first data flow is transmitted in the second optical receiver is a third delay.

A sum of the second delay and the third delay is the first delay.

The first optical receiver 104 is configured to receive a second data flow sent by the second network device. The second data flow carries indication information.

The processor 101 is specifically configured to determine the first delay based on the indication information.

In an embodiment, the indication information includes the first delay.

In an embodiment, when the optical module does not support delay measurement, the first delay is a design value.

Figure 11:
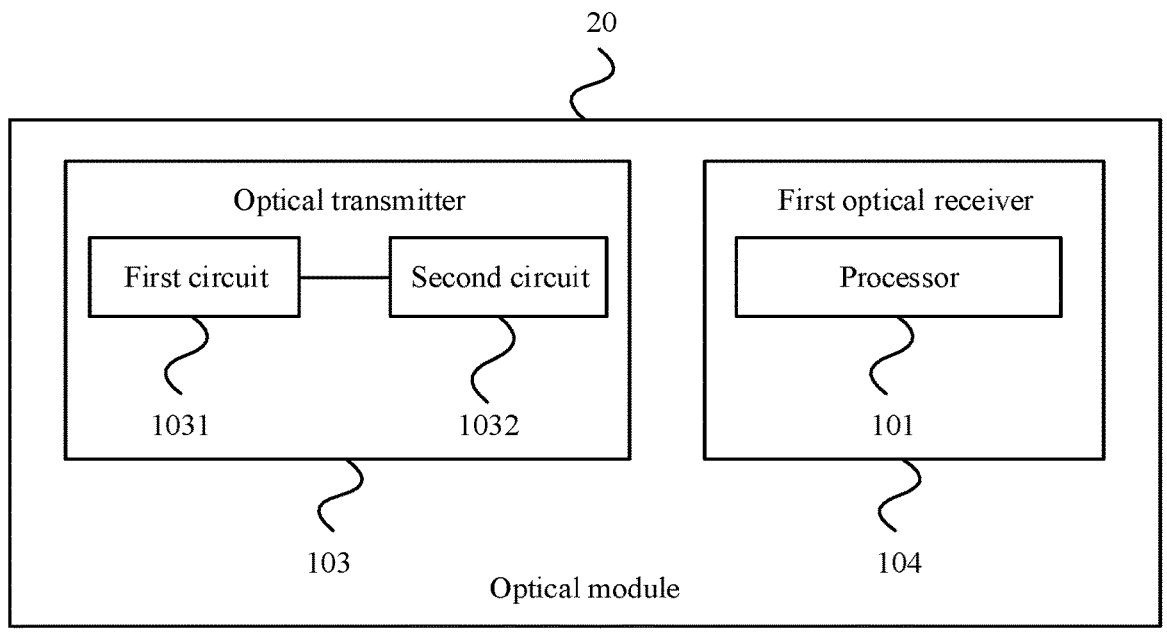
FIG. 11 is a schematic structural diagram of still another optical module according to an embodiment of this application.

FIG. 11 is a schematic structural diagram of still another optical module according to an embodiment of this application. Referring to FIG. 11, based on the embodiment shown in FIG. 10, the optical transmitter 103 includes a first circuit 1031 and a second circuit 1302. The processor 101 is further configured to:

when the first data flow is transmitted to the first circuit, extract a first indication signal carried in the first data flow;

when the first data flow is transmitted to the second circuit, extract a second indication signal carried in the first data flow; and determine the first delay based on the first indication signal and the second indication signal.

In an embodiment, the processor 101 is further configured to:

measure a phase difference between the first indication signal and the second indication signal; and determine the first delay based on the phase difference.

Both the first indication signal and the second indication signal are alignment marker AM indication signals, or the first indication signal is an AM indication signal and the second indication signal is a digital signal processing DSP frame header signal.

In an embodiment, the interface chip includes at least one of a physical layer PHY chip and a media access control layer MAC chip.

The processor 101 may be one or more integrated circuits configured to implement the foregoing method, for example, an oDSP, one or more application-specific integrated circuits (ASIC), one or more microprocessors, or one or more field programmable gate arrays (FPGA). For another example, the processor may be a central processing unit (PU) or another processor that can invoke a program.

Figure 12:
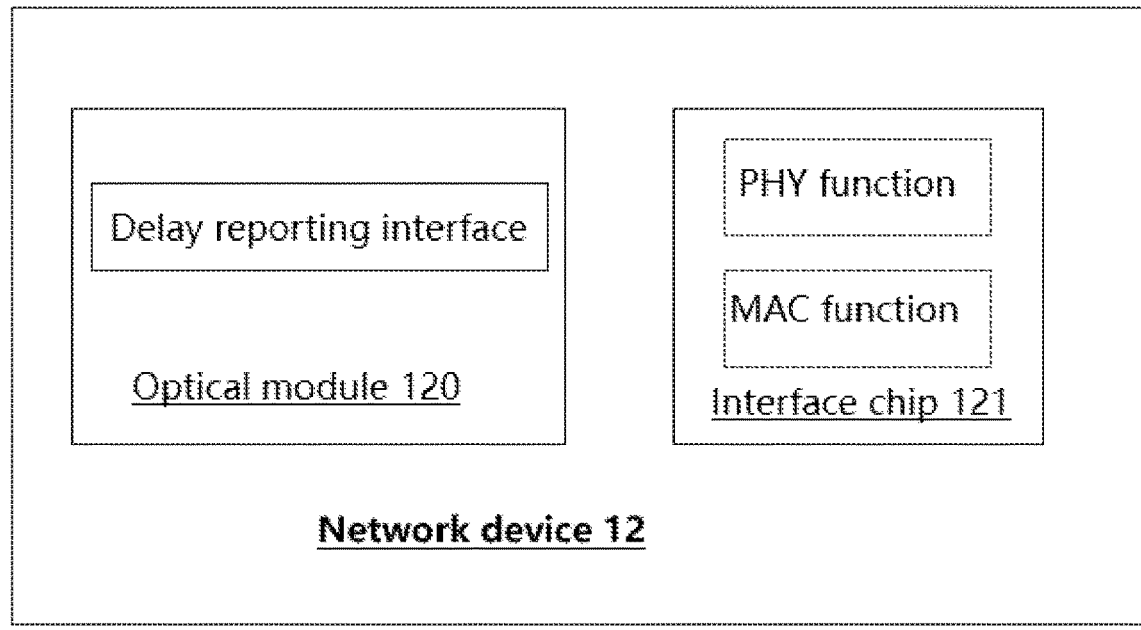
FIG. 12 is a schematic structural diagram of a network device according to an embodiment of this application.

The optical module provided in the embodiments of this application may perform the foregoing corresponding method embodiment. Implementation principles and the technical effects of the optical module are similar to those in the method embodiment. Details are not described herein again. FIG. 12 is a schematic structural diagram of a network device 12 comprising an optical module 120 and an interface chip 121, the optical module 120 can be similar to the optical module 10 shown in FIG. 9 or optical module 20 shown in FIG. 10 or FIG. 11 according to the embodiments of this application. Referring to FIG. 12, the optical module 120 comprises a delay reporting interface, and the upper interface chip 121 includes at least one of a PHY layer chip or a MAC layer chip.

An embodiment of this application further provides a computer-readable storage medium. The computer-readable storage medium stores a computer program. When the program is executed by a processor, a procedure related to the first optical module in the communication method provided in the foregoing method embodiment may be implemented.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    extracting, by an optical module in a network device, a first indication signal carried in a packet transmitted to a first circuit of the optical module;
    extracting, by the optical module, a second indication signal carried in the packet transmitted to a second circuit of the optical module;
    determining, by the optical module, a delay based on the first indication signal and the second indication signal, wherein the delay comprises a delay generated when the packet is transmitted in the optical module; and
    sending, by the optical module through a delay reporting interface of the optical module, the delay to an interface chip in the network device, wherein the interface chip includes at least one of a physical (PHY) layer chip and a media access control (MAC) layer chip.

2. The method according to claim 1, wherein the optical module comprises an optical transmitter, and wherein the delay comprises a delay generated by a transmission of the packet in the optical transmitter.

3. The method according to claim 1, wherein the optical module comprises an optical transmitter, and wherein the delay comprises a delay generated by at least one circuit in the optical transmitter processing the packet.

4. The method according to claim 3, wherein the optical transmitter comprises a digital signal processing module, and the at least one circuit comprises at least one circuit in the digital signal processing module.

5. A first optical module used in a first network device, the first optical module comprising:
    a processor, configured to:
    extract a first indication signal carried in a first packet transmitted to a first circuit of the first optical module;
    extract a second indication signal carried in the first packet transmitted to a second circuit of the first optical module;
    determine a first delay based on the first indication signal and the second indication signal, wherein the first delay comprises a delay generated when the first packet is transmitted in the first optical module; and
    a delay reporting interface, configured to send the first delay to an interface chip in the first network device, wherein the interface chip includes at least one of a physical (PHY) layer chip and a media access control (MAC) layer chip.

6. The first optical module according to claim 5, wherein the first optical module comprises an optical transmitter, and the optical transmitter comprises the processor and the delay reporting interface, wherein
    the first delay comprises a delay generated by a transmission of the first packet in the optical transmitter.

7. The first optical module according to claim 5, wherein the first optical module comprises an optical transmitter, and the optical transmitter comprises the processor, the delay reporting interface, and at least one circuit, wherein
    the first delay comprises a delay generated by the at least one circuit processing the first packet.

8. The first optical module according to claim 7, wherein the optical transmitter comprises a digital signal processing module, and the at least one circuit comprises at least one circuit in the digital signal processing module.

9. The first optical module according to claim 5, wherein the first optical module comprises an optical receiver, and the optical receiver comprises the processor and the delay reporting interface.

10. The first optical module according to claim 9, wherein the optical receiver comprises at least one circuit, wherein
the first delay comprises a delay generated by the at least one circuit processing a second packet.

11. The first optical module according to claim 10, wherein the optical receiver comprises a digital signal processing module, and the at least one circuit comprises at least one circuit in the digital signal processing module.

12. The first optical module according to claim 10, wherein a delay generated by a transmission of the second packet in an optical transmitter in a second optical module comprises a second delay, a delay generated by a transmission of the second packet in the optical receiver in the first optical module comprises a third delay, and the first delay comprises the second delay and the third delay.

13. The first optical module according to claim 5, wherein the first optical module comprises an optical transmitter and a first optical receiver, and the first optical receiver comprises the processor and the delay reporting interface, wherein
the optical transmitter is configured to receive a first data flow, wherein a delay generated by the transmission of the first packet in the optical transmitter comprises a second delay;
the optical transmitter is further configured to send the first data flow to a second optical receiver in a second optical module in a second network device, wherein a delay generated by the transmission of the first data flow in the second optical receiver comprises a third delay;
the first optical receiver is configured to receive a second packet sent by the second network device, wherein the second data flow carries information put in the second data flow by the second network device; and
the processor is specifically configured to determine the first delay based on the information, wherein the first delay comprises the second delay and the third delay.

14. The first optical module according to claim 5, wherein the processor is further configured to:
measure a phase difference between the first indication signal and the second indication signal; and
determine the first delay based on the phase difference.

15. The first optical module according to claim 5, wherein the delay reporting interface is configured to:
when a clock state of the first optical module changes, report the first delay to the interface chip; or
when a link of the first optical module is successfully established, report the first delay to the interface chip.

16. The first optical module according to claim 5, wherein the first delay is a maximum sending delay value or a minimum sending delay value when the optical module is configured to send data; or the first delay is a maximum receiving delay value or a minimum receiving delay value when the optical module is configured to receive data.

17. The first optical module according to claim 5, wherein both the first indication signal and the second indication signal are alignment marker (AM) indication signals, or the first indication signal is an AM indication signal and the second indication signal is a digital signal processing (DSP) frame header signal, or both the first indication signal and the second indication signal are start-of-frame delimiters (SFDs).

18. A network device, comprising an optical module, the optical module comprising:
a processor, configured to:
extract a first indication signal carried in a first packet transmitted to a first circuit of the first optical module;
extract a second indication signal carried in the first packet transmitted to a second circuit of the first optical module;
determine a first delay based on the first indication signal and the second indication signal, wherein the first delay comprises a delay generated when a packet is transmitted in the optical module; and
a delay reporting interface, configured to send the first delay to an interface chip in the network device, wherein the interface chip includes at least one of a physical (PHY) layer chip and a media access control (MAC) layer chip.

19. The network device according to claim 18, wherein the optical module comprises an optical transmitter, and the optical transmitter comprises the processor and the delay reporting interface, wherein
the first delay comprises a delay generated by a transmission of the first packet in the optical transmitter.

20. The network device according to claim 18, wherein the processor is further configured to:
measure a phase difference between the first indication signal and the second indication signal; and
determine the first delay based on the phase difference.

* * * * *